(12) United States Patent
Guan et al.

(10) Patent No.: US 7,460,342 B2
(45) Date of Patent: Dec. 2, 2008

(54) METHOD TO FORM TAPERED MAGNETIC SHIELD FOR PERPENDICULAR RECORDING HEAD

(75) Inventors: Lijie Guan, San Jose, CA (US); Yaw-Shing Tang, Saratoga, CA (US); Ellis Cha, San Ramon, CA (US)

(73) Assignee: Headway Technologies, Inc., Milpitas, CA (US)

( * ) Notice: Subject to any disclaimer, the term of this patent is extended or adjusted under 35 U.S.C. 154(b) by 711 days.

(21) Appl. No.: 11/074,416

(22) Filed: Mar. 8, 2005

(65) Prior Publication Data

US 2006/0203395 A1   Sep. 14, 2006

(51) Int. Cl.
*G11B 5/127* (2006.01)
(52) U.S. Cl. ..................................... 360/319
(58) Field of Classification Search ............... 360/319, 360/317, 322, 323; 29/603.07, 603.15
See application file for complete search history.

(56) References Cited

U.S. PATENT DOCUMENTS

| | | | |
|---|---|---|---|
| 6,198,597 B1 | 3/2001 | Tateyama et al. | 360/126 |
| 6,742,241 B1 | 6/2004 | Sasaki | 29/603.07 |
| 7,152,305 B2* | 12/2006 | Werner | 29/603.16 |
| 7,236,333 B2* | 6/2007 | Macken | 360/319 |
| 2002/0126422 A1* | 9/2002 | Westwood | 360/317 |

OTHER PUBLICATIONS

Co-pending U.S. Appl. No. 11/117,672, filed Apr. 28, 2005, assigned to the same assignee.
Co-pending U.S. Appl. No. 11/117,673, filed Apr. 28, 2005, assigned to the same assignee.

* cited by examiner

*Primary Examiner*—Allen T Cao
(74) *Attorney, Agent, or Firm*—Saile Ackerman LLC; Stephen B. Ackerman

(57) ABSTRACT

The inadvertent introduction of stray fields at the media surface by the shields that form part of a magnetic read-write head has been eliminated by using a combination of masking and ion milling to remove small amounts of material close to the shields' outer edges. As a consequence, instead of presenting a sharp edge to the ABS, a shield's lower surface slopes gently away from it.

29 Claims, 4 Drawing Sheets

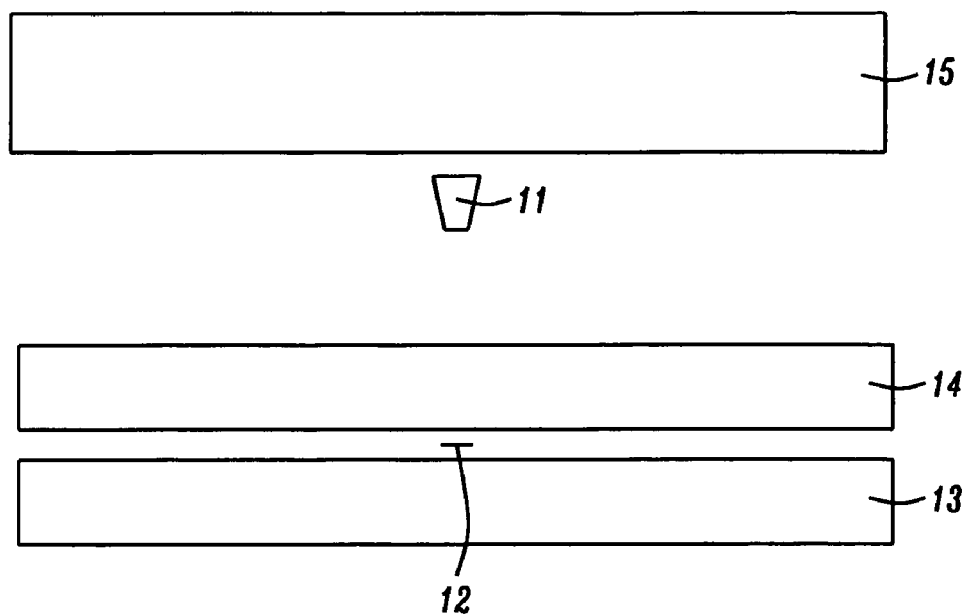
*FIG. 1 - Prior Art*
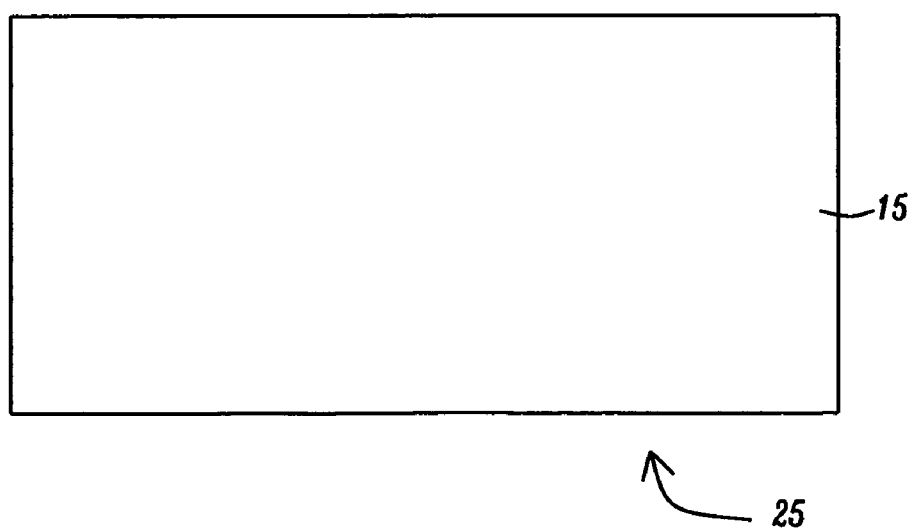
*FIG. 2 - Prior Art*

METHOD TO FORM TAPERED MAGNETIC SHIELD FOR PERPENDICULAR RECORDING HEAD

FIELD OF THE INVENTION

The invention relates to the general field of perpendicular magnetic recording (PMR) with particular reference to shaping the associated magnetic shields

BACKGROUND OF THE INVENTION

As magnetic recording is pushed to higher areal densities, perpendicular recording offers advantages in thermal stability over longitudinal recording, thus delaying arrival at the super-paramagnetic limit. Another advantage of perpendicular recording with single pole (SP) head and perpendicular media, with a soft underlayer (SUL), is the ability to produce a larger write field than that of a ring head to record on relatively thick media with high anisotropy constant.

A typical read-write unit is illustrated in FIG. 1 which provides an ABS (air bearing surface) view of the assembly i.e. the unit as seen when looking directly up from the surface of the recording media. Shown in FIG. 1 are perpendicular magnetic write pole 11 and GMR (giant magneto-resistance) read head 12. Also shown, and of particular interest for the present invention, are three magnetic shields. Read head 12 is seen to be symmetrically disposed between shields 13 and 14 while write pole 11 is centrally located between shields 14 and 15.

Shields 13, 14, and 15 can serve as magnetic flux conductors for external fields which causes them to direct a certain amount of flux into the recording medium. When such a flux density is large enough, unwanted writing or erasing can occur. In particular, because of the magnetic softness of the shield materials, a small amount of external field can induce relatively large fields in the media and cause unintended erasure of information on the media.

In most current PMR designs the shields have a strictly rectangular shape as seen in FIG. 2. Due to the finite thickness and moment of the soft magnetic underlayer, flux distribution is not uniform over the surfaces of the shields. At sharp corners and edges, the flux density can be much higher than that at the shield center. In general, data under a shield corner will usually be erased first.

In application Ser. No. 11/117,672 filed Apr. 28, 2005, we disclosed a method and structure which greatly reduces a PMR head's sensitivity to stray field erasure, especially from shield corner field concentration. The basic principle disclosed there is to recess the corner from the ABS with an angle, shown as angle 31 in FIG. 3. This approach is pursued further In the present invention and a novel process is disclosed which allows excellent control of shield wall edge angle by post-lapping the ABS by means of ion milling.

In FIG. 4 we show the calculated dependence of maximum field in the media on the shield recess angle (in FIG. 3). The dimension of the shield in the calculation are 60 µm (W), 20 µm (L), and 4 µm (T). An external field of 200 Oe is assumed. As can be seen, the erasing field monotonically drops with reducing shield wall angle, the reduction being more pronounced when the wall angle is less 10 deg. However, creating such a small wall angle at wafer level poses great difficulties for current wafer processes. In the present invention we disclose a novel method to control the shield wall angle A routine search of the prior art was performed with the following references of interest being found:

In U.S. Pat. No. 6,198,597, Tateyama et al. disclose corner portions of the rear part of the magnetic pole recessed from the ABS by 0.05 microns or more by ion milling. An angle of 45 degrees is mentioned. In U.S. Pat. No. 6,742,241, Sasak, describes a light shield mask having an acute angle at the corner but this is not the same type of shield as that with which the present invention is concerned.

SUMMARY OF THE INVENTION

It has been an object of at least one embodiment of the present invention to eliminate stray fields at the edges of magnetic shields used in conjunction with magnetic read-write heads.

Another object of at least one embodiment of the present invention has been to provide a process for tapering shield edges.

Still another object of at least one embodiment of the present invention has been that said process require little or no modification to the processes currently in use for the manufacture of such magnetic shields.

These objects have been achieved by using a combination of masking and ion milling to remove small amounts of material close to the shields' outer edges. Thus, instead of presenting a sharp edge to the ABS, the shield's lower surface slopes gently away from the ABS so that the inadvertent of stray fields at the media surface is eliminated.

BRIEF DESCRIPTION OF THE DRAWINGS

FIG. 1 shows an ABS view of a magnetic read-write head of the prior art, including its three shields.

FIG. 2 is a side view of one of the shields of the prior art.

DESCRIPTION OF THE PREFERRED EMBODIMENTS

Figure 3:
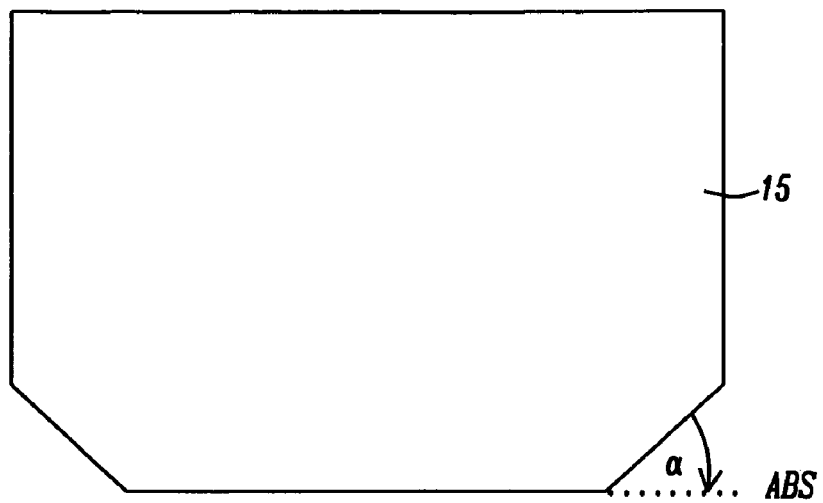
FIG. 3 shows a recent modification to shield shape that we have introduced in order to reduce the introduction of stray fields, from external sources, at the media surface.
Figure 4:
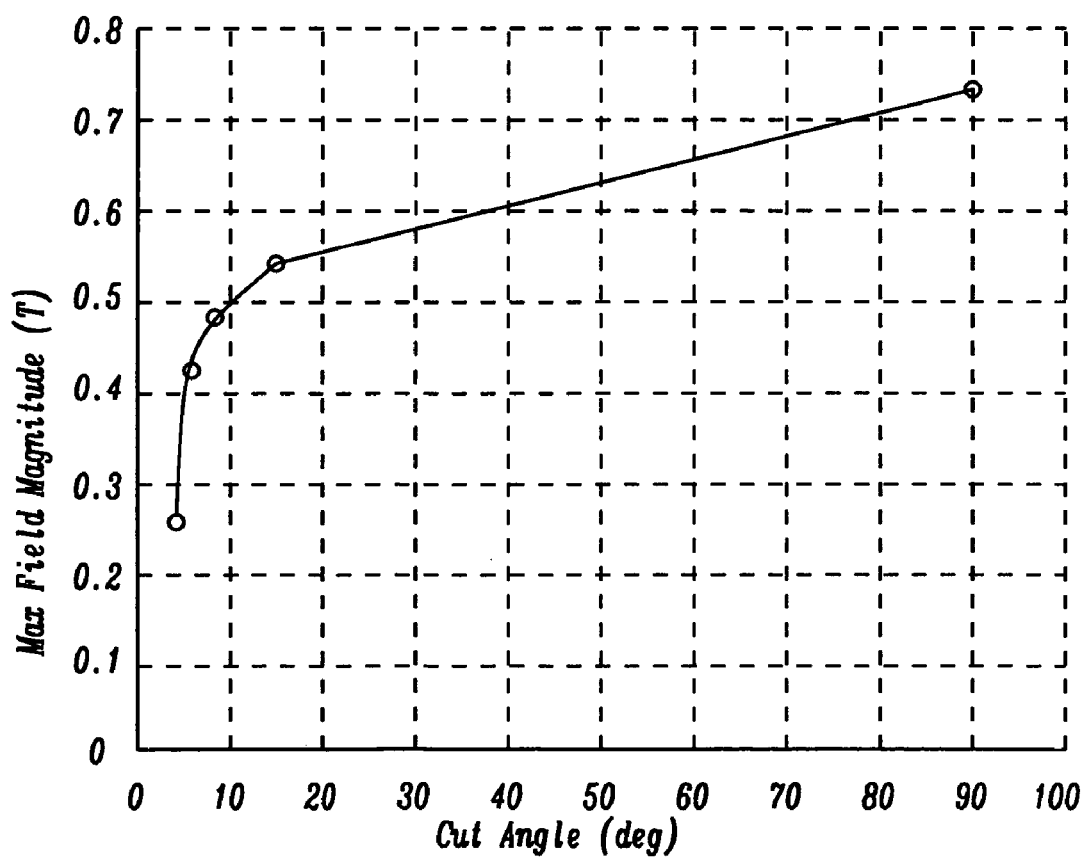
FIG. 4 is a plot of maximum field at the media surface as a function of the angle subtended, relative to the ABS, of a shield's corner edge.
Figure 5:
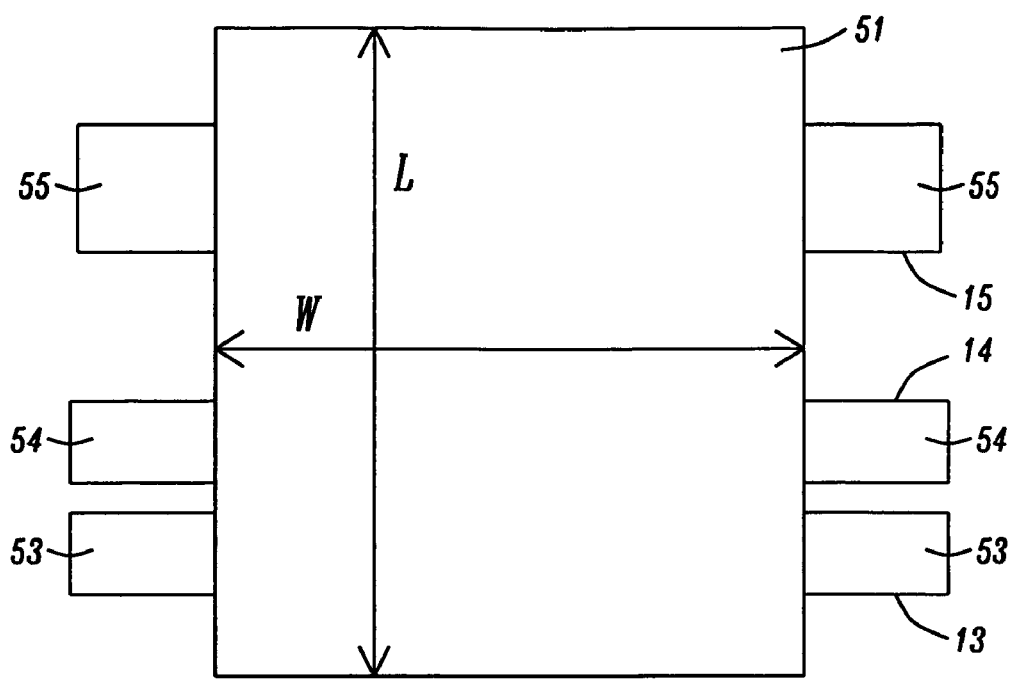
FIGS. 5 and 6 are two examples of masks that may be used in conjunction with ion beam milling to shape the edges of shields.
Figure 6:
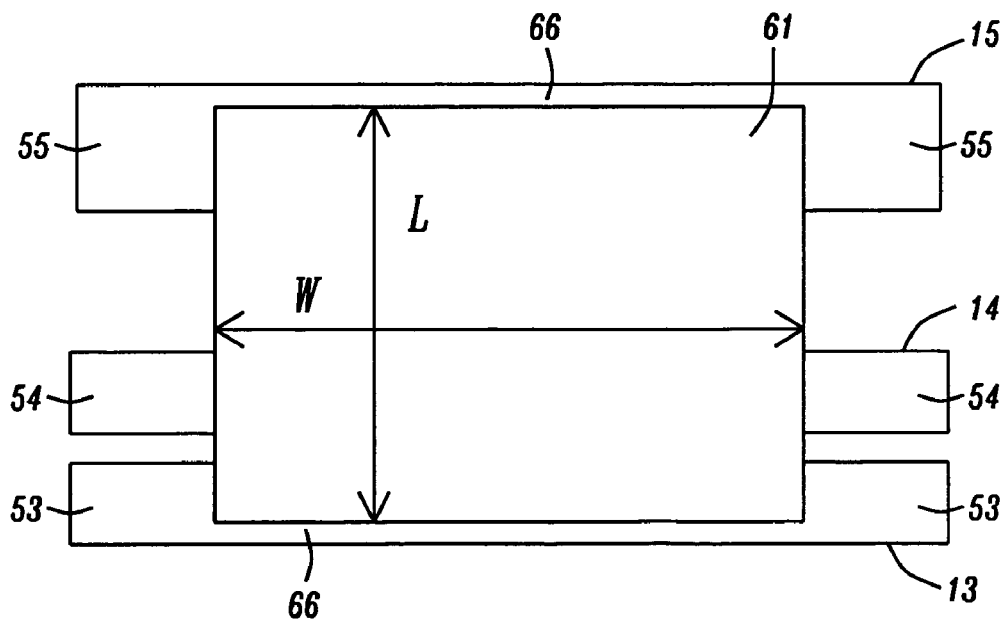

We now present details concerning our method to control the shield wall angle by post-lapping the ABS using an ion milling process. FIG. 5 shows an ion milling mask 51, generally of photoresist though a hard mask could be used if preferred. The width W of mask is less than that of shields. The length L can be chosen by either greater than the spacing of bottom shield to top shield (FIG. 5) or less than that (mask 52 in FIG. 6).

In conventional practice the mask width W is usually much larger than the shield width. During ion milling, the entire shield structure is protected by the mask, always resulting in sharp corners. In the present invention the mask width W is carefully chosen so that an outside portion of the shield will be trimmed by the ion beam to form a gentle slope at the shield's edge.

Figure 7:
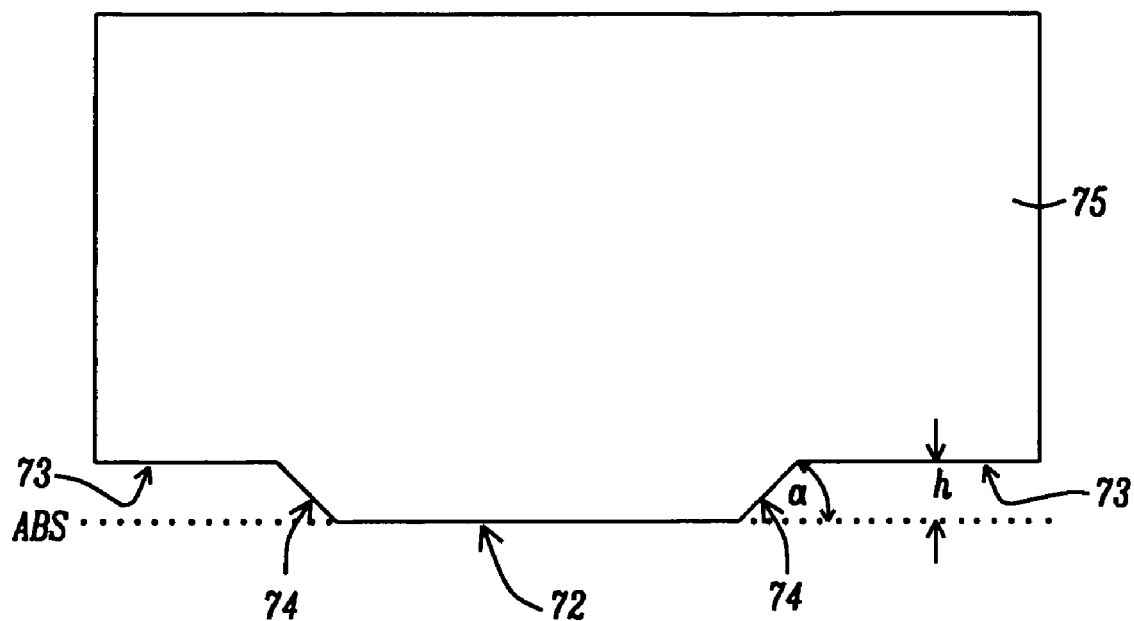
FIG. 7 is a side view of a mask formed according to the teachings of the present invention.

When ion milling is performed, the portion of the shield area that is without mask protection will recess away from the ABS at a shallow angle. In the case of FIG. 5, the recess of the shield will be one directional (cross-track). In the case FIG. 6, shield recess is two dimensional (cross-track and down-track), leading to further reductions in the erasing field. FIG. 7 shows the front view of shield 75 (originally shield 15) after ion-milling. The angle is between about 1 and 10 and the maximum recess depth h is between about 100 nm and 200 nm, which is sufficient to ensure that the outside corner after ion milling would not cause erasure. This ion milling can be integrated with the current slider building process.

Returning briefly to FIG. 1, the process of the present invention begins with the provision of an assembly that includes magnetic read head 12, centrally disposed between magnetic shields 13 and 14, and perpendicular magnetic write pole 11 disposed between magnetic shields 14 and 15. This assembly is then polished so that the read and write heads and all three shields have coplanar lower surfaces that constitute an ABS (surface 25 in FIG. 2 being one of these surfaces).

Referring next to FIG. 5, mask 51 is formed on this ABS. The mask covers the read and write heads, as well as the magnetic shields, except for opposing unprotected areas 53, 54, and 55 that extend inwards, between about 1 and 30 microns, from the shields' vertical edges.

At the conclusion of the ion beam treatment, as seen in FIG. 7, the lower surfaces of the shields, including shield 15, take on the form of a centrally located lower surface 72, that is coplanar with the ABS, together with two opposing lower surfaces 73 that are parallel to, and located a short distance, of between about 500 and 5,000 Angstroms, above, the ABS. Surfaces 72 and 73 are connected to one another through sloping surfaces 74.

If mask 51 was used, the process of the invention would be terminated at this point with the removal of mask 51. Alternatively, in a second embodiment of the invention, mask 61 (FIG. 6) may be used. In such a case, in addition to the areas 53, 54, and 55, areas 66 (each of which extends inwards from the outer horizontal edges of shields 13 or 15 a distance that is between about 0.1 and 1 microns) are also left uncovered. As in the previous embodiment, ion milling is now used to modify the form of the assembly's lower surface.

Figure 8:
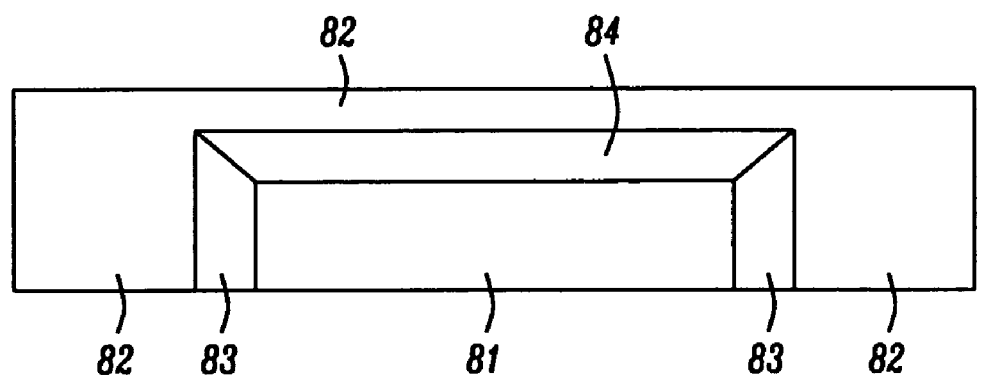
FIG. 8 is an ABS view of the lower surface of a shield that has been processed according to the teachings of the present invention.

FIG. 8 is an isometric ABS view of the lower surface of shield 15. Seen there is centrally located lowest surface 81 that is coplanar with the ABS. Located a short distance above the ABS is surface 82 which surrounds lowest surface 81 on three sides. Opposing sloping surfaces 83 connect surfaces 81 and 82 along a horizontal direction while single sloping surface 84 performs the same function along a vertical direction. As before, the process concludes with the removal of mask 61.

For both of the above-described embodiments, we have determined that erasing magnetic fields at the shields' sloping edges are reduced by at least 30% relative to erasing fields potentially present in prior art designs wherein the shields edges are orthogonal to the ABS.

What is claimed is:

1. A process to modify a magnetic shield in order to reduce sensitivity to external magnetic fields of a magnetic read-write head, comprising:

providing an assembly that includes a magnetic read head, centrally disposed between first and second magnetic shields, and a perpendicular magnetic write head disposed between a third magnetic shield and said second magnetic shield;

polishing said assembly so that said read and write heads and all three said shields have coplanar lower surfaces that constitute an ABS;

forming, on said ABS, a mask, having vertical edges, that covers said read and write heads as well as said magnetic shields except for opposing unprotected areas that extend inwards a first distance from said shields' vertical edges;

by means of ion beam milling, removing material from said unprotected areas whereby said third shield acquires a first, centrally located, lower surface, that is coplanar with the ABS, two opposing second lower surfaces that are parallel to, and located a second distance above, the ABS, and opposing sloping surfaces that connect said first and second lower surfaces; and then removing said mask.

2. The process recited in claim 1 wherein the step of removing material from said unprotected areas further comprises scanning the unprotected areas at a uniform velocity while varying said ion beam's power at a rate that causes said opposing sloping surfaces to be planar.

3. The process recited in claim 1 wherein the step of removing material from said unprotected areas further comprises scanning the unprotected areas at a constant beam power while decreasing said ion beam's velocity at a rate that causes said opposing sloping surfaces to be planar.

4. The process recited in claim 1 wherein the step of removing an amount of material from said unprotected areas further comprises scanning the unprotected areas at a variable velocity and ion beam power that together cause said opposing sloping surfaces to be planar.

5. The process recited in claim 1 wherein said opposing sloping surfaces are planar and each subtends an angle of between about 1 and 20 degrees relative to the ABS.

6. The process recited in claim 1 wherein the step of removing material from said unprotected areas further comprises scanning the unprotected areas at a uniform velocity while varying said ion beam's power at a rate that causes said opposing sloping surfaces to be rounded relative to the ABS.

7. The process recited in claim 1 wherein the step of removing material from said unprotected areas further comprises scanning the unprotected areas at a constant beam power while varying said ion beam's velocity at a rate that causes said opposing sloping surfaces to be rounded relative to the ABS.

8. The process recited in claim 1 wherein the step of removing an amount of material from said unprotected areas further comprises scanning the unprotected areas at a variable velocity and ion beam power that together cause said opposing sloping surfaces to be rounded relative to the ABS.

9. The process recited in claim 1 wherein said first distance from said shields' vertical edges is between about 1 and 300 microns.

10. The process recited in claim 1 wherein said second distance above the ABS of the two opposing second lower surfaces is between about 500 and 5,000 Angstroms.

11. A process to modify a magnetic shield in order to reduce sensitivity to external magnetic fields of a magnetic read-write head, comprising:

providing an assembly that includes a magnetic read head, centrally disposed between first and second magnetic shields, and a perpendicular magnetic write head disposed between a third magnetic shield and said second magnetic shield;

polishing said assembly so that said read and write heads and all three said shields have coplanar lower surfaces that constitute an ABS;

forming, on said ABS, a mask, having vertical and horizontal edges, that covers said read and write heads as well as said magnetic shields except for opposing unprotected areas that extend inwards a first distance from said shields' vertical edges and a single unprotected area that extends inwards a second distance from said third shield's outer horizontal edge;

by means of ion beam milling, removing material from said unprotected areas whereby said third shield acquires a first, centrally located, lower surface that is coplanar with the ABS, a second lower surface located a third distance above the ABS and surrounding said first lower surface on three sides, opposing sloping surfaces that connect said first and second lower surfaces along a horizontal direction, and a single sloping surface that connects said first and second lower surfaces along a vertical direction; and then removing said mask.

12. The process recited in claim 11 wherein said opposing sloping surfaces are planar and each subtends an angle of between about 1 and 20 degrees relative to the ABS.

13. The process recited in claim 11 wherein said single sloping surface is planar and subtends an angle of between about 1 and 20 degrees relative to the ABS.

14. The process recited in claim 11 wherein said opposing sloping surfaces are rounded relative to the ABS.

15. The process recited in claim 11 wherein said single sloping surface is rounded relative to the ABS.

16. The process recited in claim 11 wherein said second distance that said single unprotected area extends inwards from said shields' vertical edges is between about 1 and 300 microns.

17. A magnetic shield having reduced sensitivity to external magnetic fields, comprising:

an assembly that includes a magnetic read head, centrally disposed between First and second magnetic shields, and a perpendicular magnetic write head disposed between a third magnetic shield and said second magnetic shield;

said assembly being constructed so that said read and write heads and all three said shields have coplanar lower surfaces that constitute an ABS; and said third shield having a first, centrally located, lower surface that is coplanar with the ABS, two opposing second lower surfaces that are parallel to, and located a second distance above, the ABS, and opposing sloping surfaces that connect said first and second lower surfaces.

18. The magnetic shield described in claim 17 wherein said opposing sloping surfaces are planar and each subtends an angle of between about 1 and 20 degrees relative to the ABS.

19. The magnetic shield described in claim 17 wherein said opposing sloping surfaces are rounded relative to the ABS.

20. The magnetic shield described in claim 17 wherein said first distance from said shields' vertical edges is between about 1 and 30 microns.

21. The magnetic shield described in claim 17 wherein said second distance above the ABS of the two opposing second lower surfaces is between about 500 and 5,000 Angstroms.

22. The magnetic shield described in claim 17 wherein erasing magnetic fields at said shield's sloping edges are reduced by at least 30% relative to erasing fields potentially present at any orthogonal edge of said shield.

23. A modified magnetic shield having reduced sensitivity to external magnetic fields, comprising:

an assembly that includes a magnetic read head, centrally disposed between first and second magnetic shields, and a perpendicular magnetic write head disposed between a third magnetic shield and said second magnetic shield;

polishing said assembly so that said read and write heads and all three said shields have coplanar lower surfaces that constitute an ABS;

forming, on said ABS, a mask, having vertical and horizontal edges, that covers said read and write heads as well as said magnetic shields except for opposing unprotected areas that extend inwards a first distance from said shields' vertical edges and a single unprotected area that extends inwards a second distance from said third shield's outer horizontal edge;

by means of ion beam milling, removing material from said unprotected areas whereby said third shield acquires a first, centrally located, lower surface that is coplanar with the ABS, a second lower surface, located a third distance above the ABS and surrounding said first lower surface on three sides, opposing sloping surfaces that connect said first and second lower surfaces along a horizontal direction, and a single sloping surface that connects said first and second lower surfaces along a vertical direction; and then removing said mask.

24. The modified magnetic shield described in claim 23 wherein said opposing sloping surfaces are planar and each subtends an angle of between about 1 and 20 degrees relative to the ABS.

25. The modified magnetic shield described in claim 23 wherein said single sloping surface is planar and subtends an angle of between about 1 and 20 degrees relative to the ABS.

26. The modified magnetic shield described in claim 23 wherein said opposing sloping surfaces are rounded relative to the ABS.

27. The modified magnetic shield described in claim 23 wherein said single sloping surface is rounded relative to the ABS.

28. The modified magnetic shield described in claim 23 wherein said second distance that said single unprotected area extends inwards from said shields' vertical edges is between about 1 and 30 microns.

29. The magnetic shield described in claim 23 wherein erasing magnetic fields at said shield's sloping edges are reduced by at least 30% relative to erasing fields potentially present at any orthogonal edge of said shield.

* * * * *